United States Patent [19]
Boerstoel et al.

[11] Patent Number: 5,932,158
[45] Date of Patent: Aug. 3, 1999

[54] CELLULOSE SOLUTIONS AND PRODUCTS MADE THEREFROM

[75] Inventors: Hanneke Boerstoel, Arnhem; Bernardus Maria Koenders, Westrvoort; Jan Barend Westerink, Lochem, all of Netherlands

[73] Assignee: Akzo Nobel N.V., Arnhem, Netherlands

[21] Appl. No.: 09/028,841

[22] Filed: Feb. 24, 1998

Related U.S. Application Data

[62] Division of application No. 08/793,815, Feb. 25, 1997, Pat. No. 5,817,801.

[30] Foreign Application Priority Data

Aug. 19, 1994 [NL] Netherlands ............................ 9401351
Oct. 24, 1994 [NL] Netherlands ............................ 9401762
Apr. 21, 1995 [NL] Netherlands ............................ 1000193

[51] Int. Cl.$^6$ ................................. D01F 2/02; C08B 1/00
[52] U.S. Cl. .................................... 264/176.1; 264/177.1; 264/177.11; 264/177.13; 264/177.18; 264/177.19; 264/178 R; 57/258; 57/295
[58] Field of Search ................................ 264/165, 176.1, 264/177.11, 177.13, 177.18, 177.19, 178 R; 57/258, 295

[56] References Cited

U.S. PATENT DOCUMENTS

| 4,058,411 | 11/1977 | Bellamy et al. ............................ 127/37 |
| 4,839,113 | 6/1989 | Villaine et al. ............................ 264/28 |
| 5,368,385 | 11/1994 | Adamo et al. ............................ 366/139 |
| 5,571,468 | 11/1996 | Meraldi et al. ............................ 264/187 |

FOREIGN PATENT DOCUMENTS

| 168876 | 1/1986 | European Pat. Off. . |
| 54859 | 2/1943 | Netherlands . |
| 1348396 | 10/1987 | Russian Federation . |
| 1397456 | 5/1988 | Russian Federation . |
| 263810 | 7/1926 | United Kingdom . |
| 762959 | 12/1956 | United Kingdom . |

WO 95/20696 | 8/1995 | WIPO .

OTHER PUBLICATIONS

Derwent Patent Abstract 88/351892/49 (1988).
Derwent Patent Abstract 88/153465/22 (1988).
Patent Abstracts of Japan, vol. 17, No. 42, C–1020 (1993).
D. Helm et al., "Elaboration of a Procedure for Identification of Bacteria Using Fourier–Transform IR Spectral Libraries: A Stepwise Correlation Approach", Journal of Microbiological Methods 14 (1991) 127–142.
D. Helm et al., "Classification and Identification of Bacteria by Fourier–Transform Infrared Spectroscopy", Journal of General Microbiology (1991), 137, 69–79.
Y. Cohen et al., "Microfibrillar Network of a Rigid Rod Polymer. 2. Small–Angle X–ray Scattering", Macromolecules 1988, 21, 441.
A.S. Chegolya et al., "Production of Regenerated Cellulose Fibers Without Carbon Disulfide", Textile Research Journal 59 (Sep. 1989), No. 9, 501–506.
K. Kamide et al., "Formation and Properties of the Lyotropic Mesophase of the Cellulose/Mixed Inorganic Acid System", Polymer Journal, vol. 25, No. 5, 453–461.
W.H. De Jeu, Physical Properties of Liquid Crystalline Materials, Gordon and Breach Science Publishers, New York, 1980, 34–36.
D. Sinclair, "A Bending Method for Measurement of the Tensile Strength and Young's Modulus of Glass Fibers", Journal of Applied Physics, vol.. 21, May, 1950, 380–386.

*Primary Examiner*—Nathan M. Nutter
*Attorney, Agent, or Firm*—Oliff & Berridge, PLC

[57] ABSTRACT

An optically anisotropic solution containing cellulose and inorganic acids of phosphorus contains 94–100 wt % of the following constituents: cellulose; phosphoric acid and/or its anhydrides; and water; and 0–6 wt % of other constituents. This solution can be prepared in an apparatus in which intensive mixing is made possible by the shearing forces generated by mixers and kneaders in the apparatus. The solution can be used in making pulp, hollow fibres, staple fibre, membranes, nonwovens, or films.

15 Claims, No Drawings

CELLULOSE SOLUTIONS AND PRODUCTS MADE THEREFROM

This is a divisional application of U.S. application Ser. No. 08/793,815, filed on Feb. 25, 1997, which is now U.S. Pat. No. 5,817,801.

The invention pertains to an optically anisotropic solution containing cellulose and inorganic acids of phosphorus, a process for preparing such solutions, the making of products therefrom, and the products thus obtained.

Japanese patent publication JP 4258648 discloses cellulose solutions in which at least cellulose, water, and a mixture of two acids are employed. The description states that, in order to effect proper dissolution of the cellulose, the solvent may not contain in excess or 85 wt. % of ortho-, meta-, pyro-, or polyphosphoric acid. Cellulose solutions exhibiting optical anisotropy are obtained by mixing sulphuric acid, ortho- or polyphosphoric acid, and water in a weight ratio of 10–20/70–80/10–20 and dissolving at least 15 wt. % of cellulose therein.

Such optically anisotropic solutions containing cellulose and an inorganic acid of phosphorus are also described in an article by K. Kamide et al. of Asahi Chemical Industry Co., "Formation and Properties of the Lyotropic Mesophase of the Cellulose/Mixed Inorganic Acid System," *Polymer Journal* Vol. 25, No. 5 (1993), 453–461. This article clearly indicates that anisotropic solutions can only be obtained with a mixture of sulphuric acid/polyphosphoric acid/water as solvent and at least 16 wt. % of cellulose.

Sulphuric acid has a highly oxidative effect on cellulose, causing it to degrade. In addition, the use of sulphuric acid promotes corrosion and so is less advisable for industrial applications. A further drawback consists in that the use of a mixture of different acids such as sulphuric acid and phosphoric acid is disadvantageous in industrial applications, while recovering the solvent after manufacture of the product from a solvent system containing several acids was likewise found to be disadvantageous. The system as mentioned in the aforesaid article does not permit a great deal of control over major process settings, since with only one anisotropic system being deemed feasible, the viscosity and the proper temperature are all but fixed.

The present invention relates to an anisotropic solution of cellulose which obviates the aforementioned drawbacks. The invention relates to an anisotropic solution according to the preamble of the claim, and is characterised in that the solution contains 94–100 wt. % of the following constituents:

cellulose, phosphoric acid and/or its anhydrides, and water.

In the present patent specification the solvent is made up, by definition, of the added phosphoric acid and/or anhydrides thereof, and all the water present in the solution which is not chemically bonded. For that reason, water derived from the cellulose that is generally added at a later time is always considered to be part of the solvent in this description, as is water from substances which are among "other constituents", which substances may be added at any time during the preparation of the solution.

The term phosphoric acid in this application stands for all inorganic acids of phosphorus, including mixtures thereof. Orthophosphoric acid is an acid of pentavalent phosphorus, i.e., $H_3PO_4$. The anhydrous equivalent thereof, i.e., the anhydride, is also known as phosphorus pentoxide ($P_2O_5$). Depending on the amount of water in the system, there is, in addition to orthophosphoric acid and phosphorus pentoxide, a series of pentavalent phosphoric acids with a water-binding capacity between the pentoxide and the ortho-acid. Alternatively, solvents of, say, orthophosphoric acid with a concentration of orthophosphoric acid of less than 100% may be used.

Due to some reaction between the phosphoric acid and the cellulose, the solution may contain phosphorus derivatives of cellulose. These derivatives of cellulose are also considered to belong to the constituents making up 94–100 wt. % of the solution. Where the percentages by weight of cellulose in solution listed in this patent specification concern phosphorus derivatives of cellulose, they relate to quantities calculated back on the cellulose. The same holds for the amounts of phosphorus mentioned in this specification.

The anisotropic solution

Already at a cellulose concentration of 8% in a solution of phosphoric acid according to the invention anisotropy was observed, and anisotropic solutions were still obtained at cellulose concentrations of 40% or higher. Such high concentrations preferably are prepared at elevated temperatures. Selecting a cellulose concentration of more than 8% gives a significantly more economical method of making products from the solutions. Thus anisotropic cellulose solutions can be obtained by selecting a cellulose concentration in the range of about 8 to 40%. Optimum processing of these solutions into fibres was found to be attained in the range of 10 to 30%, preferably 12.5 to 25%, more particularly 15 to 23%. Different fields of application of the solutions may have other optimum concentration ranges.

To obtain the solvent system by means of which anisotropic solutions according to the present invention can be attained, the phosphorus content is determined by converting the quantities by weight of phosphoric acid in the solvent into the equivalent quantities by weight of the corresponding anhydride. Converted in this way, orthophosphoric acid is composed of 72.4% of phosphorus pentoxide and residual water, while polyphosphoric acid $H_6P_4O_{13}$ is composed of 84% of phosphorus pentoxide and residual water.

The concentration of $P_2O_5$ in the solvent is calculated by starting from the overall quantity by weight of inorganic acids of phosphorus and their anhydrides, and the overall amount of water in the solvent, converting the acids into water and $P_2O_5$, and calculating which percentage of said overall quantity by weight is made up of $P_2O_5$. If other phosphoric acids are employed, the conversion into the corresponding anhydrides is carried out analogously.

According to the teaching of Japanese patent publication JP 4258648, it is possible to obtain anisotropic solutions by randomly replacing one phosphoric acid with another, taking into account that the weight percentage of the replacer acid in the solution is the same as that of the replaced acid.

By contrast, it has now been found that anisotropic solutions according to the present invention cannot be obtained by randomly replacing one phosphoric acid with another while taking into account that the acid weight percentages in the solution stay the same, but that it is a question of randomly replacing one acid with another as long as the percentage calculated back on the anhydrides is kept within certain limits. A particular part in forming anisotropic solutions according to the invention is played by the water content of the solvent, including the amount of water in the cellulose and in the acid.

If a phosphorus system contains acids of pentavalent phosphorus, the solvent for preparing the solution according to the invention will contain 65–80 wt. % of phosphorus pentoxide, preferably from 70 to 80 wt. %. In a most preferred embodiment of the present invention, a solvent containing from 71 to 75 wt. % of phosphorus pentoxide is used for preparing anisotropic solutions containing 8 to 15 wt. % of cellulose, and a solvent containing from 72 to 79 wt. % of phosphorus pentoxide is used for preparing anisotropic solutions containing 15 to 40 wt. % of cellulose.

In addition to water, phosphoric acid and/or anhydrides thereof, cellulose, and/or reaction products of phosphoric acid and cellulose other substances may be present in the solution.

For instance, solutions can be prepared by mixing constituents classifiable into four groups: cellulose, water, inorganic acids of phosphorus and their anhydrides, and other constituents. The "other constituents" may be substances which benefit the processability of the cellulose solution, solvents other than phosphoric acid, or additives, e.g., to counter cellulose degradation as fully as possible, or dyes and the like.

The solution according to the present invention is composed of 94–100 wt. % of cellulose, phosphoric acid and/or anhydrides thereof, and water. Preferably, the solution is composed of 96–100 wt. % of cellulose, phosphoric acid and/or anhydrides thereof, and water. Preferably, adjuvants or additives are present only in an amount of 0 to 4 wt. %, calculated on the overall quantity by weight of the solution. More favoured still is a solution containing the lowest possible amount of substances other than the constituents cellulose, phosphoric acid and/or anhydrides thereof, and water, i.e., from 0 to 1 wt. % of additives.

Preparation of the anisotropic solution

Russian patent publications SU 1348396 and SU 1397456 provide several examples of the preparation of solutions of cellulose in phosphoric acid. The overall period of time required to obtain a homogeneous solution ranges from 2 to 400 hours. Moreover, it was found that there is a sharp and uncontrolled decrease of the degree of polymerisation during the preparation of the solution.

It is undesirable, when making solutions according to the present invention on an industrial scale, to need long periods to dissolve in view of the then required size of the storage/dissolving tanks. Furthermore, the continuous preparation of such solutions is hindered by long periods needed to dissolve. Also, a sharp, uncontrolled decrease of the cellulose DP can be disadvantageous as regards the further use of the solution, e.g., when the solution is employed to make cellulose fibres. An uncontrolled decrease of the DP during the preparative process will also make it more difficult to prepare a solution of fairly constant quality, more particularly when various types of cellulose are used in the preparation of the solution.

It is clear from the aforementioned patent publications that dissolving cellulose in a solvent primarily containing phosphoric acid will take a long time.

U.S. Pat. No. 5,368,385 discloses that the dissolution in water of polymers which are extremely soluble in water is severely hampered by the formation of a impermeable film on the wetted surface of formed polymer lumps. Without wishing to be bound by any theory, applicant supposes that during the dissolution of cellulose particles in phosphoric acid the outer layer of the cellulose employed dissolves comparatively quickly to form an impermeable layer, analogous to the disclosure of U.S. Pat. No. 5,368,385. It is this impermeable layer which hampers/slows down the further dissolution of the cellulose enclosed by it. Several processes were found which provide an answer to this problem.

One answer can be seen to lie in the very rapid and thorough mixing of cellulose and the phosphoric acid-containing solvent, the mixing action preferably being such as will give particulate cellulose in the solvent before the formation of a too thick impermeable layer around the pieces of cellulose can slow down further dissolution too much. The rate at which the impermeable layer is formed, i.e., the rate at which the cellulose is dissolved in the phosphoric acid-containing solvent, can be decreased by lowering the temperature at which the cellulose is contacted with the solvent. When there is particulate cellulose in the solvent, said particulate cellulose preferably is on a micro scale, e.g., in the form of cellulose fibrils, dissolution of these small pieces in a short time will give a solution containing cellulose and inorganic acids of phosphorus.

Alternatively, an answer can be seen to lie in so processing the cellulose during its mixing with the phosphoric acid-containing solvent that the impermeable outer layer formed on the cellulose is removed therefrom with great regularity.

The mixing of cellulose and the phosphoric acid-containing solvent will proceed more rapidly as the cellulose in the solvent is in smaller pieces. To this end the cellulose may already be rendered particulate, e.g., by being pulverised, prior to being combined with the solvent. Alternatively, the cellulose and the solvent can be combined in such an apparatus as will not only provide intermixing of the cellulose and the solvent but also a reduction in size of the pieces of cellulose present in the mixture.

When preparing a cellulose-containing solution using cellulose and a phosphoric acid-containing solvent, three steps can be distinguished in addition to combining the cellulose and the solvent, viz.:

1 reducing the cellulose in size, 2 mixing the cellulose and the phosphoric acid-containing solvent, and 3 dissolving the cellulose in the solvent.

Given the rate at which cellulose is dissolved in a phosphoric acid-containing solvent, steps 2 and 3 cannot be considered independently. When the cellulose and the solvent are intermixed, the cellulose will also dissolve in the solvent. As has been indicated above, the dissolution of the cellulose can be slowed down by lowering the temperature.

Step 1 can be dissociated from steps 2 and 3. One example of this is the preparation of a solution from powdered cellulose and a phosphoric acid-containing solvent.

As has been indicated above, it is also possible to combine all three steps, i.e., by combining the reduction in size, mixing, and dissolution of the cellulose in a single apparatus equipped such that the cellulose can be reduced in size and mixed in the presence of the solvent.

Especially when cellulose solutions are to be prepared on an economically attractive scale, it is advantageous to combine the aforesaid three steps in a single apparatus, especially if it proves possible to prepare a cellulose solution in such an apparatus in a continuous process, i.e., a preparative process in which starting materials are fed to the apparatus in a more or less constant stream while a cellulose solution is discharged from the apparatus also in a more or less constant stream.

It was found that solutions according to the present invention can be prepared if cellulose and the phosphoric acid-containing solvent are combined in an apparatus in which the shearing forces generated by its mixers and kneaders ensure that there can be intensive mixing of one or more added constituents. In a suitable embodiment the mixing and kneading apparatus used to practice the process according to the invention is a high-shear mixer. Examples of high-shear mixers known to the skilled person include a Linden-Z kneader, an IKA-duplex kneader, a Conterna kneader, or a twin-screw extruder.

A highly suitable embodiment involves making use of an apparatus which also permits particle size reduction. Preferably, the high-shear mixer also permitting particle size reduction is a twin-screw extruder.

By proper selection of the mixing, kneader, and milling units and their order on the shafts of a twin-screw extruder many different forms of cellulose, such as sheets, strips, scraps, chips, and powder, can be reduced in size where needed and mixed thoroughly with the phosphoric acid-containing solvent before the dissolution of the cellulose in the solvent is slowed down too much by the formation of an impermeable layer.

After combination of the phosphoric acid-containing solvent and the cellulose in a mixing or kneading apparatus, the cellulose is mixed with the solvent and there is cellulose dissolution. The degree of mixing should be such as will prevent the cellulose dissolution being slowed down too much by the formation of an impermeable layer on the cellulose. The cellulose dissolution can be slowed down by lowering the temperature. One advantageous process involves the cellulose and the solvent being combined in an apparatus, with the temperature in the section of the apparatus where the cellulose and the solvent are combined and mixed being less than 30° C., preferably in the range of 0° C. to 20° C. In another favourable embodiment the solvent, prior to being combined with the cellulose, is cooled such that its temperature is below 25° C. In that case the solvent can be either in the solid or in the liquid state. It is possible to cool the solvent, prior to being combined with the cellulose, in such a way as to be in the form of small pieces of solid solvent.

According to another advantageous embodiment, first a portion of the solvent is mixed with the-cellulose, after which the remaining solvent is added to the formed mixture/solution in one or several steps.

An advantageous process will have the apparatus constructed such that during the mixing and kneading the starting products and the formed solution are conveyed from an opening in the apparatus where the solvent and the cellulose are combined to another opening where the solution leaves the apparatus. Examples of such apparatus include a Conterna kneader, a twin-screw extruder, an Linden-Z kneader, and a Busch co-kneader.

In a favourable embodiment of the process a twin-screw extruder is used as mixing and kneading apparatus with a conveying system.

In such an apparatus there may be several different zones for the products in the apparatus to pass through. In the first zone there will be primarily mixing of the supplied cellulose with the solvent and reduction in size. In the next zone the dissolution of cellulose will also play a major part. The subsequent zone will primarily hold the formed solution, which is subjected to further homogenisation and mixed with the as yet undissolved cellulose.

In such an apparatus the dissolution of cellulose and the properties of the formed solution can be affected by the temperature selected for the various zones.

By selecting a temperature for the first zone which is below 30° C., preferably in the range of 0° to 20° C., the dissolution of cellulose can be slowed down. By increasing the temperature, e.g., in a next zone, cellulose dissolution is speeded up. It should be noted in this connection that heat may be generated both during cellulose dissolution and as the solvent and the cellulose are combined.

By selecting the temperature and the residence period in the zone of the mixing and kneading apparatus which primarily contains cellulose in solution, the cellulose solution DP can be controlled. Generally speaking, it holds that the higher the temperature and the longer the residence period at this temperature are, the greater the decrease of the cellulose DP will be. In addition, the DP of the starting material may have an effect on the decreasing DP for a particular temperature and residence period.

Since the heat exchange between the products in the apparatus and the apparatus itself will not be ideal as a rule, there may be temperature variations between the products in the apparatus and the apparatus itself.

The apparatus can further have a zone in which the formed solution is de-aerated, e.g., by passing the solution through a reduced pressure zone. Also in this zone or in a separate zone water or other constituents may be extracted from or added to the formed solution.

To remove any remaining small undissolved particles from the solution, it may be filtered either in the apparatus or on leaving it. The resulting solution is high-viscous. It can be used immediately, but also stored for some time at low temperature, e.g., between −20° and 10° C. Generally speaking, the longer it is desired to store the solution, the lower the temperature selected should be.

It should be noted that the obtained solution may become solid, e.g., through crystallisation, if it is stored for some time at a lower temperature. Heating the formed solid mass will again give a high-viscous solution.

The above process makes it possible to prepare cellulose solutions in a short period of time and with a controlled decrease of the cellulose DP. For instance, it was found that within 15 minutes or even less a cellulose solution could be made from powdered cellulose and a solvent containing phosphoric acid. This time period can be further reduced by selecting a higher temperature for forming the solution.

The solution according to the invention can be prepared using all available types of cellulose, such as Arbocell BER 600/30, Arbocell L 600/30, Buckeye V5, Buckeye V60, Buckeye V65, Viscokraft, hemp, flax, ramie and Eucaliptus cellulose, all of which types are known to the skilled person. Cellulose can be added in a wide range of forms, e.g., in sheets, strips, scraps, chips, or as a powder. The form in which the cellulose can be added is restricted by its introduction into the mixing and kneading apparatus. If the cellulose employed is in a form which cannot be charged to the apparatus, it should be reduced in size outside the apparatus in a known manner, e.g., with a hammer mill or a shredder.

The cellulose to be used preferably has an α-content of more than 90%, more particularly of more than 95%. For spinning good fibres from the solutions it is recommended to employ so-called dissolving pulp with a high α-content, e.g., such as is generally used in the manufacture of fibres for industrial and textile applications. Examples of suitable types of cellulose include Arcobell BER 600/30, Buckeye V60, Buckeye V65, and Viscokraft. The cellulose DP as determined by the procedure to be indicated hereinafter in this patent specification advantageously is in the range of 250 to 1500, more particularly in the range of 350 to 1350. The DP of the cellulose in the solution preferably is in the range of 215 to 1300, more particularly in the range of 325 to 1200.

Cellulose as it is commercially available generally contains some water and may be used as such without any objection. Of course, it is also possible to use dried cellulose, but this is not essential.

If use is made of a mixture of different inorganic phosphoric acids to obtain a solvent having the desired quantity of acid converted into anhydride, the acids after being mixed preferably are heated to a temperature in the range of 30° to 80° C. and the solvent is kept heated for ½–12 hours. In some cases, depending on the acids used, other times and/or temperatures may be desired. For instance, a very homogeneous solution without surface irregularities can be obtained by employing a solvent made by melting down orthophosphoric acid at a temperature in the range of about 40° to 60° C., adding the desired quantity of polyphosphoric acid, mixing the two, and cooling the mixture to about 20° C.

According to a suitable method, the solvent is left to stand some time, e.g., between 30 minutes and several hours, before being combined with cellulose.

The other constituents can be added to the solvent prior to its combination with the cellulose. Alternatively, the other constituents can be added to the cellulose prior to its combination with the solvent. Also, the other constituents can be added as the solvent is combined with the cellulose. In addition, of course, the other constituents can be added after the solvent and the cellulose have been combined.

Time, the temperature at which the solution is stored, and the acid concentration were all found to have a major effect on the content of phosphorus bound to cellulose in the solution.

Phosphorus is assumed to be bound to cellulose if, after a thorough washing treatment and, optionally, a neutralisation treatment, a coagulated solution is still found to contain phosphorus.

It was found that a solution according to the present invention containing 18 wt. % of cellulose, which was obtained by dissolving cellulose in a solvent containing 80 wt. % of orthophosphoric acid and 20 wt. % of polyphosphoric acid, will contain approximately 0.25 wt. % of bound phosphorus after storage for 1 hour at 30° C. However, if such a solution is stored at 50° C., it will contain approximately 0.8 wt. % of bound phosphorus after 1 hour.

It was found that a solution according to the invention will at any rate contain at least 0.02% of phosphorus bound to cellulose.

It was found that by adding a small quantity of water to the solvent just prior to the addition of the cellulose, simultaneously with the addition of cellulose, or just after the addition of cellulose, a solution with a low content of phosphorus bound to cellulose can be obtained.

The obtained solution can be used to various ends. For instance, the solution can be used in making fibres, both for industrial and textile applications, hollow fibres, membranes, nonwovens, films, and for other well-known applications for cellulose-containing solutions. In addition, the solution can be employed to prepare cellulose derivatives.

Spinning the anisotropic solution

The obtained solution can be spun or extruded through a spinneret having the desired number of orifices, or moulded to form a film. Spinning solutions with a cellulose concentration of from 15 to 25 wt. % preferably are extruded at a temperature between 0° and 75° C., the residence times for the higher temperatures being as brief as possible. Preferably, such solutions are extruded at a temperature between 20° and 70° C., more particularly between 40° and 65° C. For other concentrations it holds that as the concentration is higher, so the spinning temperature preferably will also be higher than the ranges indicated here to compensate, int. al., for the higher viscosity of the solution, and vice versa. However, it should be noted that a higher spinning temperature may lead to a higher content of phosphorus bound to cellulose.

The desired number of orifices in the spinneret plate is dependent on the future use of the fibres to be obtained.

Thus, a single spinneret may be used not only for extruding monofilaments but also for extruding the multifilament yarns much in demand in actual practice which contain from 30 to 10 000, preferably from 100 to 2000, filaments. The manufacture of such multifilament yarns preferably is carried out on a cluster spinning assembly containing a number of spinning orifice clusters as described in EP 168 876, or using a spinneret as described in WO 95/20696.

Following extrusion, the extrudates are passed through an air gap the length of which is selected depending upon the process conditions, e.g., the spinning temperature, the cellulose concentration, and the desired degree of drawing of the extrudates. In general, the air gap will have a length in the range of 4 to 200 mm, preferably in the range of 10 to 100 mm. Next, the obtained extrudates are passed through a coagulation bath in a manner known in itself. As suitable coagulants may be selected low boiling, organic liquids which do not have a swelling effect on cellulose, water, or mixtures thereof. Examples of such suitable coagulants include alcohols, ketones, esters, and water, or mixtures thereof. Preference is given to the use of isopropanol, n-propanol, acetone or butanone as coagulants, since they display very good coagulating action and in most cases have good properties when it comes to safety and ease of handling. For this reason mixtures of water and these coagulants also are very serviceable.

The coagulation bath preferably has a temperature in the range of −40° C. (providing the coagulant selected allows this) to 30° C., with very favourable results being obtained at coagulation bath temperatures below 20° C.

After coagulation there may be washing out, in combination or not with a neutralising treatment. The washing out may take the form of placing a spool of coagulated yarn in a vessel containing the washing agent, or else by passing the fibres through a bath containing the appropriate liquid in a continuous process and then winding them onto a roller. According to a process highly suited for use in actual practice, washing out is performed with so-called jet washers, such as described in British patent specification GB 762,959. Low boiling, organic liquids which do not have a swelling effect on cellulose, e.g., alcohols, ketones, and esters, water, or mixtures thereof can be employed as washing agent. Preference is given to the use of isopropanol, n-propanol, butanone, water, or mixtures thereof as washing agent. Highly suitable to be used are water, or mixtures of water and the coagulation agent. Washing out may be performed at any temperature below the boiling temperature of the washing agent, at any rate preferably below 100° C.

It was found that when a solution according to the invention is stored for a longer period of time or at elevated temperature, it cannot be spun into fibres by an air gap spinning process if the solution is coagulated in a water bath or if, after coagulation, the fibres are washed with water, since the fibres will swell to a great extent when contacted with water.

It was also found that if the quantity of water absorbed by a fibre during coagulation in a water bath or when the fibre is washed out in a water bath is higher than 560% in relation to the dry weight of the fibre, then the individual fibres in the bundle can no longer be distinguished. A water absorption higher than 1300% will give gel formation. To make fibres having favourable mechanical properties, it is preferred to have a fibre moisture absorption of less than 570%.

It was found that a lower content of phosphorus bound to cellulose will also give a lower moisture absorption. It was found that if the solution according to the invention contains less than 3 wt. % of bound phosphorus and the solution is coagulated in a bath which contains less than 10 wt. % of water, e.g., an acetone coagulation bath, and the fibre is washed out in a water bath, the individual fibres in the bundle a clearly distinguishable still. It was further found that if the solution contains less than 1.3 wt. % of bound phosphorus and the solution is coagulated in water, the individual fibres in the bundle are clearly distinguishable still during water washing.

When making fibres of favourable mechanical properties, the solution preferably contains less than 0.8 wt. %, more particularly less than 0.5 wt. %, of bound phosphorus.

Neutralisation may be carried out either immediately following the washing step, or in between the coagulation and washing steps. Alternatively, neutralisation may take place after the washing step and be followed by a next washing step. The neutralising agent used may be NaOH, KOH, LiOH, NaHCO$_3$, NH$_4$OH, sodium ethanolate or sodium methanolate, e.g., using a batchwise process, such as immersion, or a continuous process, such as passing through a bath, spraying, the use of a kiss roll, or a bath equipped with jet washers.

It was found that the susceptibility of the fibres to a heat treatment can be greatly reduced by the manner of aftertreatment of the extrudates. Such a process is disclosed in our co-pending patent application based on the Netherlands patent application NL 9401351.

The solution according to the present invention is especially advantageous because its preparation and spinning can be carried out as a continuous process on a single line. In addition, the solution has the advantage that when products are made therefrom, in particular when no constituents other than phosphoric acid, water, and cellulose are employed, the cellulose and the phosphoric acid react hardly, and hence there is no, or hardly any, need for cellulose regeneration.

Thus are obtained in a highly advantageous manner cellulose fibres especially suited to be used in rubber articles subjected to mechanical load, such as vehicle tires, conveyor belts, rubber hose, and the like. The fibres are particularly suited to be used as a reinforcement in vehicle tires, e.g., car and truck tires.

Fibres obtained by spinning the solution according to the invention were found to have a good resistance to dynamic compression load. It was found that this resistance increases with the decreasing content of phosphorus bound to cellulose in the solution. This resistance can be measured, e.g., by employing a so-called GBF (Goodrich Block Fatigue) test.

Generally speaking, the now found fibres constitute a favourable alternative to industrial yarns such as nylon, rayon, polyester, and aramid.

Further, the fibres can be pulped. Such pulp, which may be mixed with other materials, such as carbon pulp, glass pulp, aramid pulp, polyacrylonitrile pulp, or not, is highly suited to be used as a reinforcing material, e.g., in asphalt, cement and/or friction materials.

Properties of fibers obtained by spinning the anisotropic solution.

The invention also relates to the resulting cellulose fibres, which have very good mechanical properties such as strength, modulus, and favourable elongation. Since it is found that the solvent reacts with the cellulose hardly, the properties obtained from the cellulose structure, such as the chain modulus, are retained, while the anisotropy of the solution makes it possible to attain properties desired in many mechanical applications.

The properties of the fibres make them particularly suited for use in technical applications.

Using the solution according to the present invention, fibres can be prepared having far better properties than the cellulose fibres known in the art used in technical applications, e.g., Cordenka 660® and Cordenka 700®, which are prepared using the so-called viscose process.

Using the solution according to the present invention cellulose yarns can be made which have a breaking tenacity higher than 700 mN/tex, more in particular higher than 850 mN/tex, a maximum modulus at an elongation of less than 2% of at least 14 N/tex, and an elongation at break of at least 4%, more in particular higher than 6%.

Due to the nature of the spinning solution and the coagulant, the fibres contain from 0.02 to 1.3 wt. % of phosphorus bound to the cellulose if the fibres are coagulated in water or from 0.02 to 3.0 wt. % of phosphorus bound to the cellulose if the fibres are coagulated in a coagulant which does not contain water and washed with water. Preferably the fibres contain from 0.02 to 0.5 wt. % of phosphorus bound to the cellulose.

The filaments in a yarn bundle have a much higher compression strength than filaments of prior art yarns, viz. from 0.30 to 0.35 GPa for filaments obtained using the solution according to the present invention in comparison with from 0.15 to 0.20 GPa for filaments of prior art yarns.

Furthermore, when the yarns are examined using Confocal Laser Scanning Microscopy (CLSM), hardly any pores can be detected in the filaments, whereas filaments of prior art yarns show a large number of these pores. The same properties are found when small angle X-ray scattering is used.

In WO 85/05115 celluloseformate and regenerated cellulose multifilament yarns spun from anisotropic phosphoric acid containing solutions are reported. The yarns show a morphology which appears to be built up of layers embedded in each other, which surround the axis of the filaments, and which besides varies pseudoperiodically along the axis of the filaments. In WO 94/17136 it is suggested that the morphology is connected with the anisotropic solution from which the filaments are obtained.

Although the yarns according to the present invention are obtained from an anisotropic solution which contains phosphoric acid, the yarns do not show a morphology as described in WO 85/05115.

Using wide angle X-ray diffraction, a crystal structure is found which is similar to the crystal structure of prior art cellulose yarns. The halfwidths of some reflections in the diffration pattern can be used to estimate the size of crystalline regions in the yarn. It was found that the aspect ratio (crystal height/crystal width) of the yarns according to the invention is considerably higher than for prior art yarns prepared using the viscose process, viz. from 4.3 to 5.0 and from 2.5 to 3.5, respectively.

The sonic modulus of the yarns according to the invention reflects the higher (tensile) modulus of these yarns. These higher moduli of the yarns according to the present invention probably reflects the higher molecular orientation of the cellulose molecules, which might be due to the anisotropic nature of the spinning solution.

However, the higher modulus is not accompanied by a higher lateral birefringence of the yarns, which is often found in fibres. For the yarns according to the invention a lateral birefringence smaller than $11*10^{-4}$ is found, whereas for prior art yarns prepared using the viscose process a lateral birefringence of from $12*10^{-4}$ to $26*10^{-4}$ is found.

Another measurement technique which clearly shows the difference between the yarns according to the present invention and prior art yarns, is Raman Spectroscopy. This technique provides information about the molecular vibrations of a compound. Like other spectroscopic techniques, the spectrum recorded using this technique can be used as a kind of fingerprint of the material. Major differences between the fibres according to the present invention and the prior art fibres are found in the Raman spectrum between 100–600 cm$^{-1}$ and can be made more quantitatively by using hierarchical cluster analysis. Using this technique, the splitting between the yarns according to the present invention and prior art fibres, expressed as a heterogenuity value, is larger than 0.70.

It was found that only one of the above mentioned properties shows a significant dependence on the amount of phosphorus bound to the cellulose, viz. the resistance to dynamic compression load, which can be measured using a fatigue test. Furthermore, it was found that the relative residual strength of the cellulose yarns after being tested is linear proportional to the amount of phosphorus bound to the cellulose. When the amount of phosphorus bound to the cellulose in a yarn is plotted (on the x-axis in wt. %) versus the relative residual strength of a tested yarn (on the y-axis in % residual strength, i.e. % rs), a least square linear regression computation of the data points reveals a regression coefficient, i.e. the slope of the linear fitted line through the data points, of from −30 to −70% rs/wt. %, more in particular of from −40 to −60% rs/wt. %. It was found further that the constant term which results from the computation depends on the modulus of the tested yarn. A decrease of the modulus of the yarn is accompanied by an increase of the constant term, thus at a constant amount of phosphorus bound to the cellulose, the relative residual strength of the fibres after being tested is higher when the modulus of the fibres is lower.

In addition, the fibres possess good adhesion to rubber after a single impregnation with conventional adhesive, e.g., dipping with a resorcinol-formaldehyde latex (RFL) mixture.

Measurement techniques

Determination of birefringence Δn of the solution

The birefringence Δn was determined with the aid of an Abbe refractometer type B, e.g., as described in W. H. de Jeu, *Physical properties of Liquid Crystalline Materials* (London: Gordon & Breach, 1980), p. 35. The measurements were carried out at room temperature (20° C.), with use also being made of a Tamson oil bath to control the temperature, a Eurotherm digital thermometer and type J thermo-couple, a halogen lamp of 12V 20W. A polariser was used in the refractometer's ocular lens. The index of refraction of the liquid was determined by measuring the angle of contact. The refractometer is constructed such that the index of refraction is given at the mavelength of the Na D-line (589.3 nm). This means that the dispersion of the index of refraction was compensatred for. The birefringence an Δn=n∥−n$_{/}$. In the isotropic phase Δn is 0 by definition.

Solutions are considered to be anisotropic if birefringence is observed in a condition of rest. Generally speaking, this holds for measurements carried out at room temperature. However, within the framework of the present invention solutions which can be processed—e.g., by fibre spinning—at temperatures below room temperature and which display anisotropy at said lower temperature are considered anisotropic also. Preference is given to solutions which are anisotropic at room temperature.

Visual determination of the isotropy or anisotropy was performed with the aid of a polarisation microscope (Leitz Orthoplan-Pol (100×)). To this end about 100 mg of the solution to be defined were arranged between two slides and placed on a Mettler FP 82 hot-stage plate, after which the heating was switched on and the specimen heated at a rate of about 5° C./min. In the transition from anisotropic to isotropic, i.e., from coloured to black, the temperature is read off at virtual black. The transition temperature is indicated as T$_{ni}$ in °C.

The visual assessment during the phase transition was compared with an intensity measurement using a photosensitive cell mounted on the microscope. For this intensity measurement a specimen of 10–30 μm was arranged on a slide such that no colours were visible when crossed polarisers were employed. Heating was carried out as described above. The photosensitive cell, connected to a recorder, was used to write the intensity as a function of time. Above a certain temperature (differing for the different solutions) there was a linear decrease of the intensity. Extrapolation of this line to an intensity of 0 gave the T$_{ni}$. In all cases, the value found proved a good match for the value found by the above-mentioned method.

Determination of DP

The degree of polymerisation (DP) of the cellulose was determined with the aid of an Ubbelohde type 1 (k=0.01). To this end the cellulose specimens to be measured were dried in vacuo for 16 hours at 50° C. after neutralisation, or the amount of water in the copper II ethylene diamine/water mixture was corrected to take into account the water in the cellulose. In this way an 0.3 wt. % of cellulose-containing solution was made using a copper II ethylene diamine/water mixture (1/1). On the resulting solution the viscosity ratio (visc. rat. or ηrel) was determined, and from this the limiting viscosity number (η) was determined in accordance with the formula:

$$[\eta] = \frac{visc.rat.-1}{c + (k * c * (visc.rat.-1))} * 100$$

wherein c=cellulose concentration of the solution (g/dl) and k=constant=0.25

From this formula the degree of polymerisation DP was determined as follows:

$$DP = \frac{[\eta]}{0,42} \text{(for } [\eta] < 450 \text{ml/g), or}$$

$$DP^{0.76} = \frac{[\eta]}{2,29} \text{(for } [\eta] > 450 \text{ml/g)}$$

Determining the DP of the cellulose in the solution proceeded as described above after the following treatment:

20 g of the solution were charged to a Waring Blender (1 liter), 400 ml of water were added, and the whole was then mixed at the highest setting for 10 minutes. The resulting mixture was transferred to a sieve and washed thoroughly with water. Finally, there was neutralisation with a 2%-NaHCO$_3$ solution for several minutes and after-washing with water. The DP of the resulting product was determined as described above, starting from the preparation of the copper II ethylene diamine/water/cellulose solution.

Determination of phosphorus content

The content of phosphorus bound to cellulose in the solution, or in a cellulose product made from that solution, can be determined by combining in a decomposition flask (a) 300 mg of cellulose solution which has been coagulated, dried in vacuo for 16 hours at 50° C. after thorough washing out using water, and then stored in a sealed sample vessel with (b) 5 ml of concentrated sulphuric acid and 0.5 ml of an Yttrium solution containing 1000 mg/l of Yttrium. The cellulose is carbonised with heating. After carbonisation, hydrogen peroxide is added to the mixture in portions of 2 ml, until a clear solution is obtained. After cooling the solution is replenished with water to a volume of 50 ml. With the aid of a phosphorus calibration line determined using reference samples containing 100, 40, 20, and 0 mg/l of phosphorus, respectively, ICP-ES (Inductive Coupled Plasma-Emission Spectrometry) is used to determine the phosphorus content in the solution to be measured by means of the following equation:

$$\text{phosphorus content } (\%) = (P_{conc}(\text{mg/l}) 50)/(C_w(\text{mg})*10)$$

wherein:

$P_{conc}$=the phosphorus concentration in the solution to be measured and $C_w$=the weighed out quantity of coagulated and washed cellulose.

Yttrium is added as an internal standard to correct the solutions' differing viscosities. The phosphorus content is measured at a wavelength of 213.6 nm, the internal standard is measured at a wavelength of 224.6 nm.

Determination of water content

The quantity of water absorbed by a fibre during coagulation in a water bath or when the fibre is washed out with water can be determined by washing the fibre with water and then removing the adhering moisture through filtering off with a büchner funnel. The moisture content (in wt. % vis-à-vis the dried fibre) can be determined by measuring the decrease in weight as a result of heating for 20 minutes at 160° C.

Mechanical properties

The mechanical properties of the filaments and the yarns were determined in accordance with ASTM standard 02256-90, using the following settings.

The filament properties were measured on filaments clamped with Arnitel® gripping surfaces of 10*10 mm. The filaments were conditioned for 16 hours at 20° C. and 65% relative humidity. The length between grips was 100 mm, the filaments were elongated at a constant elongation of 10 mm/min.

The yarn properties were determined on yarns clamped with Instron 4C clamps. The yarns were conditioned for 16 hours at 20° C. and 65% relative humidity. The length between clamps was 500 mm, the yarns were elongated at a constant elongation of 50 mm/min. The yarns were twisted, the number of twists per meter being 4000/√linear density [dtex].

The linear density of the filaments, expressed in dtex, was calculated on the basis of the functional resonant frequency (ASTM D 1577-66, Part 25, 1968); the yarn's linear density was determined by weighing. The breaking tenacity, elongation, and initial modulus were derived from the load-elongation curve and the measured filament or yarn linear density.

The initial modulus (In. Mod.) was defined as the maximum modulus at an elongation of less than 2%.

Compression strength

The compression strength of filaments can be measured using the so-called Elastica test. In this test a filament loop is bent and studied simultaneously under a microscope. In the elastic part of the compressive stress-strain curve the shape of the loop remains unaltered. After a critical strain is reached the shape of the loop changes substantially. The strain at which this change occurs is taken as the critical compressive strain. As the compressive stress-strain curve is assumed to be the inverse of the tensile stress-strain curve, the compressive strength is calculated from the filament (tensile) stress-strain curve as the stress at the strain which is equal to the critical compressive strain. More information about the Elastica test can be found, e.g., in D. Sinclair, *J.Appl.Phys.*, 21, (1950), p. 380–386.

Confocal Laser Scanning Microscopy (CLSM)

For inspection of a fibre sample using CLSM, light from an Ar/Kr laser is imaged through a pinhole, a beamsplitter, and objective lenses on the fibre sample. The reflected light is directed through the objective lenses, the beamsplitter and a second pinhole to a photomultiplier detector. Due to the optical configuration, only light coming from the focal point of the objective lenses is imaged on the detector. The advantage of this kind of light microscopy is found, amongst others, in a high resolution (0.2 µm).

CLSM can be used in reflection and fluorescence mode. Reflection occurs if a difference in refractive indices exists between adjacent parts of a structure. For cellulose fibres, with a rather low birefringence, this means that only defects can be made visible. The lower limit of the size of the defects which can be detected is approximately 100 nm.

In order to examine cellulose filaments using CLSM, 6–7 single filaments are put on a glass plate, immersed in a liquid with a refrective index of 1.48, and covered with thin glass plate. A 40× 1.3 N.A. oil immersion objective lens was used to focus the laser beam on the sample.

X-ray diffraction

Wide-angle X-ray diffraction measurements on fibre samples were performed using a horizontal Philips X'pert MPD diffractometer. Cellulose fibre samples are wound on a metal frame and put in the sample holder of the diffractometer. With this apparatus it is possible to adjust the scattering angle 2θ and the azimuthal angle φ independently. The X-ray beam was focussed using a parallel plate collimator. The programmable divergence slit was fixed on ⅛°. Use was made of a copper fine focus X-ray tube.

Small-angle X-ray scattering photographs of the samples were made using a Kiessig point focus camera. For the semi-quantitative evaluation of the equatorial scattering a Kratky line-focus camera with a linear position sensitive counter was used.

A survey of the characterization of (cellulose) fibres with small-angle X-ray scattering can be found in Y. Cohen and E. L. Thomas, "Microfibrillar Network of a rigid rod polymer", *Macromolecules,* Vol. 21, (1988), p. 436.

Lateral birefringence

The lateral birefringence of the cellulose fibres was measured using the De Senarmonts method of compensation. To apply this method, a quarter waveplate was positioned in parallel position in the compensator slot of a De Senarmont compensator which was mounted in a Jenapol Interphako-U microscope equipped with Xenon illumination. Monochromatic light was obtained by using a monochromator DISP-546 nm. Compensation is brought about by rotating the analyzer in the De Senarmont compensator. The azimuth angle ω at compensation is read from the analyzer. The lateral byrefringence is then calculated by dividing the optical path difference r (r=546*ω/180) by the thickness of the sample.

Samples can be prepared by embedding a fiber bundle in Spurr low viscosity embedding material (Poly Sciences Inc.). The embedded sample is then hardened for at least 16 hours at 70° C. Slices of about 2 mm thickness can be obtained by using a Struers Accutom equipped with an Abrasive Cut-off Wheel 5 PCS 357 CA. This is preferably done in such a way that the fibers are cut through exactly perpendicular to their axis. The slices are then polished on both sides in subsequent steps with Struers Silicon carbide paper 1200 grit (14 μm), 2400 grit (10 μm), 4000 grit (6 μm), DP-mol polishing cloth with Alumina Bühler Alpha 1 (5 μm), Alpha 1C (1 μm), and Struers Alumina AP F. In this way slices can be obtained with a thickness which is generally of from 10 to 40 μm. The polished slices are cemented onto a microscope glass with, e.g., Locktide IS 401.

Raman spectroscopy

Raman spectra of cellulose fibres can be recorded with a Bruker RFS 100 Fourier Transform Raman spectrometer equipped with a 1064 nm Nd:YAG laser (Adlas, Model 421N). With this apparatus spectra can be recorded at a spectral resolution of 4 cm$^{-1}$ with a laser power of 1400 mW. The diameter of the laser beam at the sample spot is approximately 30 μm. About 5000 scans are preferably collected for each spectrum. To perform the measurements, cellulose fibres are wrapped around a mirror and mounted in the sample stage of the spectrometer. Control measurements showed that cellulose fibres are not affected by the laser irradiation.

The IDENT-2 package from the OPUS software of Bruker can be used for the hierarchical cluster analysis of the spectra. In this analysis second derivative spectra are used in the calculations. The analysis can be applied to various spectral regions by using, e.g., Ward's algorithm. Details about the clustering procedure can be found in, e.g., D. Helm, H. Labischinski, G. Schallehn and D.Naumann, *J.Gen.Microbiol,* 137, (1991), 69 and D. Helm, H. Labischinski and D. Naumann, *J.Microbiol.Methods,* 14, (1991), 127.

Fatigue test

The resistance of a cellulose yarn to a dynamic compression load can be measured according to ASTM 0885-62T using a Goodrich Disk Fatigue tester. This test is often referred to as GBF fatigue test. For this test a cellulose yarn is twisted into a two-fold cord at a helix angle of 25°. To promote the adhesion to rubber, the cord is impregnated with a resorcinol-formaldehyde latex. After impregnation, the cord is embedded in a Dunlop 5320 rubber and the rubber is vulcanised. The sample is tested in the Fatigue tester for 6 hours, at 20% compression and 0% elongation, and at 2375 cycles/minute. After being tested, the cord samples are prepared from the rubber, and the residual strength is measured. The relative residual strength is then calculated relative to the strength of the impregnated cord before the fatigue test.

The invention will be further illustrated below with reference to the examples.

Examples 1–3 relate to some properties of solutions comprising cellulose, phosphoric acid, and water.

Examples 4 and 5 relate to the continuous preparation of anisotropic solutions comprising cellulose, phosphoric acid, and water.

Examples 6–8 relate to the coagulation of fibres spun from anisotropic solutions comprising cellulose, phosphoric acid, and water.

Examples 9–12 relate to the effect of the amount of phosphorus bound to cellulose on the appearance and the water content of fibres spun from anisotropic solutions comprising cellulose, phosphoric acid, and water, which fibres are coagulated in water or acetone.

Examples 13–20 relate to spinning of fibres using anisotropic solutions comprising cellulose, phosphoric acid, and water.

Unless otherwise specified, the following starting materials (listed together with their specifications) were used to prepare the solutions in the examples.

| mat. | manufacturer and code | $P_2O_5$ [%] |
|---|---|---|
| $P_2O_5$ | J.T. Baker, 0193 | 98 |
| $H_3PO_4$ | La Fonte Electrique SA, Bex Suisse, crystallised, >99% (98,3% anal.) | 71,2 |
| $H_4P_2O_7$ | Fluka Chemika, 83210, 97% (98,8% anal.) | 78,8 |
| PPA* | Janssen Chimica, 84% min. | 84 |
| $H_2O$ | demineralised | — |

*PPA = polyphosphoric acid

EXAMPLE 1

Solutions of cellulose, one or more phosphoric acids, and water were prepared from compositions as indicated below.

The solutions were made by combining the phosphoric acids and mixing them in an IKA-duplex type HKD 06 DP kneader (0.5 l) until a clear, viscous solution was obtained, cooling the liquid and adding the cellulose, and then continuing the kneading at room temperature (20° C.) for 25 minutes. The solution was assessed visually and the DP of the cellulose in the solution determined. For each composition the $P_2O_5$ content in the solvent (by definition the sum total of inorganic phosphoric acids, anhydrides, and water used) was calculated and listed in the table.

There is a certain connection between the properties listed under 2, 3, and 4. The more +indications a solution has, the stronger its anisotropy and the related favourable properties will be. Very good solutions have +indications only.

After preparation the solutions were assessed and characterised as follows:

1 +properly dissolved—undissolved;

2 +lustrous—opaque;

3 +anisotropic—isotropic;

4 +drawing threads—not drawing threads;

in measurements:

1 microscopic assessment, + if not more than ½ of the cellulose remains undissolved.

2 visual assessment during kneading.

3 via $T_{ni}$ determination for dissolved portion's condition at 20° C.

4 visual assessment during kneading.

Solutions

Solutions containing 11.4 wt. % of cellulose were prepared by adding 12 wt. % of cellulose (containing 5% of water) to the acid mixture as listed in the table. The indicated $P_2O_5$ content is the content in the solvent, which, by definition, is made up of inorganic phosphoric acids and water. The parts by weight of acid are the amounts of acid, calculated on the overall amount of acid employed, which were weighed in to make the acid mixture to which the cellulose was added.

TABLE I

| parts by wt. of acid. | | DP | 1 | 2 | 3 | 4 | Δn. $10^4$ | Tni ° C. | $P_2O_5$ % |
|---|---|---|---|---|---|---|---|---|---|
| A | 90,1 $H_3PO_4$ | 690 | + | + | + | + | 33 | 43 | 72 |
|  | 9,9 PPA |  |  |  |  |  |  |  |  |
| B | 80,6 $H_3PO_4$ | 625 | + | + | + | + | 27 | 49 | 73 |
|  | 19,4 PPA |  |  |  |  |  |  |  |  |

TABLE I-continued

| parts by wt. of acid. | | DP | 1 | 2 | 3 | 4 | $\Delta n.$ $10^4$ | $T_{ni}$ °C. | $P_2O_5$ % |
|---|---|---|---|---|---|---|---|---|---|
| C | 70,0 H$_3$PO$_4$ 30,0 PPA | 675 | + | + | + | + | 20 | 47 | 75 |
| D | 60,4 H$_3$PO$_4$ 39,6 PPA | 695 | + | − | + | − | 10 | 42 | 76 |
| E | 85,0 PPA 15,0 H$_2$O | | + | + | + | ± | 10 | 39 | 71 |
| F | 88,0 PPA 12,0 H$_2$O | 675 | + | + | + | + | 25 | 43 | 74 |
| G | 90,1 PPA 9,9 H$_2$O | 685 | + | + | + | + | 40 | 46 | 75 |
| H | 92,7 H$_4$P$_2$O$_7$ 7,3 H$_2$O | 680 | + | + | + | + | 30 | 43 | 74 |
| I | 74,8 P$_2$O$_5$ 25,2 H$_2$O | 675 | + | + | + | + | 38 | 48 | 73 |
| J | 80,0 PPA 20,0 H$_2$O | 695 | + | − | − | ± | | 5 | 67 |
| K | 69,7 H$_3$PO$_4$ 20,4 PPA 9,9 H$_2$O | 588 | ± | − | − | − | | | 66 |
| L | 80,0 H$_3$PO$_4$ 10,0 PPA 10,0 H$_2$O | 670 | ± | − | − | − | | | 65 |
| M | 79,9 H$_3$PO$_4$ 20,1 H$_2$O | 685 | − | − | − | − | | | 57 |
| N | 20,0 H$_3$PO$_4$ 80,0 PPA | 685 | − | − | − | − | | | 81 |
| O | 100,0 PPA | | − | − | − | − | | | 83 |

It is clearly shown that when solutions containing 11.4 wt. % of cellulose do not come within the limits of 65–80% of P$_2$O$_5$ in the solvent, the cellulose no longer dissolves. Just inside these limits there is what may be called a transition area. Dissolution at a temperature in excess of room temperature will give fairly good to good solutions for compositions such as listed under K and L. These solutions are isotropic at room temperature. At a lower temperature they are anisotropic, and it is at this lower temperature that they can be processed into products to good effect.

EXAMPLE 2

In the same manner as described for Example 1 solutions containing 17.1 wt. % of cellulose were made by adding 18 wt. % of cellulose (containing 5% of water) to the acid compositions as mentioned in the table. The polyphosphoric acid (PPA) employed was ex Merck (85% P$_2$O$_5$).

TABLE II

| parts by wt. of acid. | | 1 | 2 | 3 | 4 | $\Delta n.$ $10^4$ | $T_{ni}$ °C. | $P_2O_5$ % |
|---|---|---|---|---|---|---|---|---|
| A | 100 H$_3$PO$_4$ | ± | ± | + | ± | 25 | | 70 |
| B | 94,3 H$_3$PO$_4$ 5,7 PPA | ± | ± | + | + | 60 | 69 | 71 |
| C | 87,6 H$_3$PO$_4$ 12,4 PPA | + | + | + | + | 80 | 68 | 72 |
| D | 79,2 H$_3$PO$_4$ 20,8 PPA | + | + | + | + | 80 | 70 | 73 |
| E* | 60,5 H$_3$PO$_4$ 39,5 PPA | + | + | + | + | 75 | 71 | 76 |
| F* | 47,2 H$_3$PO$_4$ 52,8 PPA | + | ± | + | + | 70 | 73 | 78 |
| G* | 42,2 H$_3$PO$_4$ 57,8 PPA | + | − | + | ± | 80 | 72 | 78 |

*starting temperature selected for rapid dissolution procedure not lower than 20° C.

EXAMPLE 3

A solvent was made of inorganic acids of phosphorus and water by heating H$_3$PO$_4$ to 43° C. and then cooling it and adding polyphosphoric acid such that the composition of the solvent for the various experiments was approximately the same at all times. The cellulose percentage was varied. For the preparation of the solutions use was made of the same starting materials as listed in Example 2.

TABLE III

| parts by wt. of acid. | | cell [%] | DP | 1 | 2 | 3 | 4 | $T_{ni}$ °C. | $P_2O_5$ % |
|---|---|---|---|---|---|---|---|---|---|
| A | 80,3 H$_3$PO$_4$ 19,7 PPA | 7,6 | | + | + | ± | + | 17* | 73 |
| B | 80,6 H$_3$PO$_4$ 19,4 PPA | 11,4 | 625 | + | + | + | + | 49 | 73 |
| C | 79,2 H$_3$PO$_4$ 20,8 PPA | 17,1 | | + | + | + | + | 70 | 73 |
| D | 77,5 H$_3$PO$_4$ 22,5 PPA | 24,7 | 560 | + | + | + | + | 82 | 73 |
| E | 79,0 H$_3$PO$_4$ 21,0 PPA | 28,5 | 400 | + | + | + | + | 93 | 73 |
| F | 81,0 H$_3$PO$_4$ 19,0 PPA | 38 | | ± | − | + | − | 117 | 71 |

*readily processable at 17° C.

EXAMPLE 4

In a Werner & Pfleiderer ZSK 30 twin-screw extruder a solution was prepared continuously using cellulose and a solvent containing inorganic acids of phosphorus.

In the transport direction of the twin-screw extruder six pairs of heating elements each of about 7.5 cm in length were arranged. These pairs of heating elements permit the setting of six different temperature zones in the transport direction of the extruder. In the first zone (zone 1) immediately beyond the throat of the twin-screw extruder a temperature of 0° C. was set. In the following zone (zone 2) a temperature of 10° C. was set. In the four subsequent zones (zones 3, 4, 5, and 6) a temperature of 20° C. was set. Moreover, zone 4 and parts of zones 5 and 6 were kept under reduced pressure. The temperature of the heating element near the endplate of the extruder was set to 15° C. Powdered cellulose, Buckeye V65, DP 700, was added via the extruder throat at a feeding rate of 2.2 kg/h. Via the first heating element in zone 1 a solution containing 80 wt. % of H$_3$PO$_4$ (orthophosphoric acid) and 20 wt. % of PPA (polyphosphoric acid, ex Stokvis) was charged at a feeding rate of 7.8 kg/h.

At an extruder screw rate of rotation of 150 rpm an optically anisotropic cellulose solution containing less than 1 wt. % of undissolved cellulose particles was formed in 10 minutes.

EXAMPLE 5

In a Conterna kneader with 6 chambers a solution was prepared continuously using cellulose and a solvent containing phosphoric acid. Cellulose (Buckeye V60 powdered cellulose, Dp=820) and the solvent, a liquid mixture of orthophosphoric acid and polyphosphoric acid (ex Stokvis) containing 74.4 wt. % P$_2$O$_5$, were dosed in the inlet of the kneader at 3.0 kg/hr and 15.7 kg/hr, respectively. The temperature in the chambers of the kneader was set to increase from 5° C. in chamber 1 (with the inlet for the dosed components) to 15–20° C. in chamber 6 (with an exit for the solution). The kneading and mixing elements in chambers 1–5 of the kneader were operated at a speed of 30–40 rpm, the kneading and mixing elements in chamber 6 were operated at a speed of 3–8 rpm. In chambers 3–5 a reduced pressure of 40–60 mbar was maintained.

In this way an optically anisotropic solution was obtained containing less than 1 wt. % of undissolved particles. The residence time of the solution in the kneader was estimated to be approximately 30 minutes.

EXAMPLE 8

A solvent was prepared by combining 80 parts by weight (pbw) of solid orthophosphoric acid ($H_3PO_4$) and 20 pbw of polyphosphoric acid (ex Stokvis) in a Werner & Pfleiderer 2.5l-Z kneader, type LUK 2.5 K3, and then homogenising the mixture for at least 40 minutes at 48° C. After a homogeneous liquid was obtained, it was cooled to 10° C., whereupon cellulose was added. Enough cellulose was added to give a final solution containing 18 wt. % of cellulose (including equilibrium moisture). In this manner, with kneading of the mass, a homogeneous solution was obtained in about 15 to 30 minutes and then degassed during the next 30 minutes. The resulting solution was introduced into a storage vessel on a spinning machine, the temperature of the storage vessel and the spinning machine being 37° C. Next, the spinning solution was pressed through a spinneret with 100 capillaries each of a diameter of 65 µm. The samples were coagulated in water. The water content and the phosphorus content of the fibres were measured as a function of time (with t=0 being the moment at which the solution was heated to a temperature of 37° C.). The appearance of the fibres was also evaluated. The results are listed in Table IV.

TABLE IV

| Time [min] | Water content [%] | Phosph. content [%] | Appearance of the fibre |
|---|---|---|---|
| 25 | 425 | 0.45 | somewhat swollen fibres, individual fibres still visible |
| 60 | 375 | 0.60 | somewhat swollen fibres, individual fibres still visible |
| 110 | 425 | 0.90 | somewhat swollen fibres, individual fibres still visible |
| 150 | 490 | 1.35 | somewhat swollen fibres, individual fibres still visible |
| 180 | 570 | 1.50 | swollen fibres, no individual fibres visible |
| 240 | 615 | 1.90 | swollen fibres, no individual fibres visible |
| 300 | 640 | 2.15 | swollen fibres, no individual fibres visible |

EXAMPLE 7

In the same manner as described in Example 6 a cellulose-containing solution was prepared. The solvent was made by intermixing 66.1 pbw of orthophosphoric acid and 33.9 pbw of polyphosphoric acid (ex Stokvis).

In the same manner as described in Example 6 the solution was pressed through a spinneret. One portion of the samples was coagulated in water, another was coagulated in acetone. For both types of coagulated samples the water and phosphorus contents were determined as a function of time. The appearance of the fibres was also evaluated. The results for the water coagulated samples are listed in Table V, those for the acetone coagulated samples are listed in Table VI.

TABLE V

Water coagulation

| Time [min] | Water content [%] | Phosph. content [%] | Appearance of the fibre |
|---|---|---|---|
| 30 | 460 | 1.04 | somewhat swollen fibres, individual fibres still visible |
| 50 | 560 | 1.49 | swollen fibres, no individual fibres visible |
| 90 | 780 | 2.50 | very strongly swollen thread |
| 125 | 1160 | 2.91 | very strongly swollen thread |
| 155 | 3230 | 3.55 | gel formation |

TABLE VI

Acetone coagulation

| Time [min] | Water content [%] | Phosph. content [%] | Appearance of the fibre |
|---|---|---|---|
| 75 | 400 | 2.01 | somewhat swollen fibres, individual fibres still visible |
| 120 | 490 | 2.90 | somewhat swollen fibres, individual fibres still visible |
| 150 | 960 | 3.49 | very strongly swollen thread |
| 190 | 3460 | 4.28 | gel formation |

EXAMPLE 8

In the same way as described in Example 6 a cellulose-containing solution was prepared. The solvent was made by intermixing 57.9 pbw of orthophosphoric acid and 42.1 pbw of polyphosphoric acid.

In the same way as described in Example 6 the solution was pressed through a spinneret plate. One portion of the samples was coagulated in water, another coagulated in acetone. For both types of coagulated samples the water and phosphorus contents were determined as a function of time. The appearance of the fibres was also evaluated. The results for the water coagulated samples are listed in Table VII, those for the acetone coagulated samples are listed in Table VIII.

TABLE VII

Water coagulation

| Time [min] | Water content [%] | Phosph. content [%] | Appearance of the fibre |
|---|---|---|---|
| 15 | 620 | 1.71 | swollen fibres, no individual fibres visible |
| 35 | 670 | 2.32 | swollen fibres, no individual fibres visible |
| 50 | 910 | 2.94 | very strongly swollen thread |
| 70 | 1790 | 3.46 | gel formation |
| 95 | 7650 | 5.90 | gel formation |

TABLE VIII

Acetone coagulation

| Time [min] | Water content [%] | Phosph. content [%] | Appearance of the fibre |
|---|---|---|---|
| 25 | 430 | 2.04 | somewhat swollen fibres, individual fibres still visible |
| 45 | 460 | 2.69 | somewhat swollen fibres, individual fibres still visible |
| 75 | 1600 | 3.67 | gel formation |
| 135 | 8250 | 5.62 | gel formation |

EXAMPLE 9

A solvent was prepared by mixing and kneading 69.1 pbw of orthophosphoric acid (71.2% $P_2O_5$) and 13.5 pbw of polyphosphoric acid (84.5% $P_2O_5$) at 60° C. in vessel until a clear, viscous liquid was obtained. The liquid was transferred to a Linden-Z kneader, heated to 35° C. and further homogenised. After 110 minutes of homogenisation the liquid was cooled down to 4° C. In this way a solvent was prepared comprising 74.3 wt. % $P_2O_5$. At this temperature 0.88 pbw water and 16.0 pbw cellulose powder (Buckeye V65) containing 5.6 wt. % of water were added. The components were thoroughly kneaded for 18 minutes, the last 13 of them under vacuum, until a homogeneous solution was obtained. The solution was thus prepared using a solvent composed of 72.7 wt. % $P_2O_5$.

Using a spinning pump this solution was passed to a spinneret via a conveying pipe having a temperature of approximately 25° C. The solution was spun out at approximately 36° C. through a spinneret with 375 capillaries each of a diameter of 65 μm, via an air gap of 30 mm, to a coagulation bath filled with different coagulants at 20° C. After being passed through this bath (about 0.5 meter) the resulting filament yarns were washed with water at 15° C. using jet washers and neutralised using a 2.5 wt. % $Na_2CO_3 \cdot 10H_2O$ solution. After neutralisation the yarns were washed again with water using jet washers, dried on a drying godet at 150° C. and wound onto a bobbin at a speed of 30 m/min.

Cellulose yarns were manufactured as indicated above using methanol, ethanol, and acetone as coagulants. The mechanical properties of the fibres so obtained are listed in TABLE IX.

TABLE IX

| Coagulant | breaking tenacity [mN/tex] | elongation at break [%] | initial modulus [N/tex] |
|---|---|---|---|
| methanol | 430 | 5,1 | 17,2 |
| ethanol | 450 | 4,7 | 17,4 |
| acetone | 630 | 5,4 | 19,4 |

EXAMPLE 10

Cellulose yarns were manufactured as indicated in example 9 using n-propanol, n-butanol, n-pentanol, and acetone as coagulants. The mechanical properties of the fibres so obtained are listed in TABLE X.

TABLE X

| Coagulant | breaking tenacity [mN/tex] | elongation at break [%] | initial modulus [N/tex] |
|---|---|---|---|
| n-propanol | 730 | 5,3 | 22,0 |
| n-butanol | 600 | 5,0 | 21,0 |
| n-pentanol | 341 | 4,4 | 15,7 |
| acetone | 610 | 5,2 | 20,2 |

EXAMPLE 11

Cellulose yarns were manufactured as indicated in example 9 using butanone, 2-pentanone, cyclopentanone, cyclohexanone, and acetone as coagulants. The mechanical properties of the fibres so obtained are listed in TABLE XI.

TABLE XI

| Coagulant | breaking tenacity [mN/tex] | elongation at break [%] | initial modulus [N/tex] |
|---|---|---|---|
| butanone | 730 | 6,6 | 19,8 |
| 2-pentanone | 650 | 5,9 | 19,5 |
| cyclopentanone | 480 | 4,3 | 19,0 |
| cyclohexanone | 600 | 5,3 | 19,0 |
| acetone | 780 | 6,0 | 21,1 |

EXAMPLE 12

Cellulose yarns were manufactured as indicated in example 9 using methylformate, methylacetate, ethylacetate, and acetone as coagulants. The mechanical properties of the fibres so obtained are listed in TABLE XII.

TABLE XII

| Coagulant | breaking tenacity [mN/tex] | elongation at break [%] | initial modulus [N/tex] |
|---|---|---|---|
| methylformate | 650 | 5,5 | 19,6 |
| methylacetate | 650 | 5,5 | 19,1 |
| ethylacetate | 690 | 6,5 | 18,8 |
| acetone | 640 | 5,5 | 19,3 |

EXAMPLE 13

A solution was prepared from 62.8 parts by weight (pbw) of orthophosphoric acid (98.3%), 17.4 pbw of polyphosphoric acid (84% $P_2O_5$), 18.8 pbw of powdered cellulose (DP 700), and 1 pbw of water derived from the cellulose, in the following manner: the acids were mixed in an IKA-duplex type HKD-T 06D kneader (0.5 l) and heated until a clear, viscous solution was obtained. Next, powdered cellulose was added and over 25 minutes the kneader was cooled down to room temperature, 10 minutes thereof with degassing. The $P_2O_5$ content in the solvent was calculated to be 73%.

The obtained solution was fed via a filter (2*120 mesh, 25 μm) to a spinning machine provided with a spinneret with 30 orifices of 70 μm each. At a jet velocity of 3 m/min and a temperature of 25° C. extrudates were formed, which after passing through an air gap of 25 mm were guided to an acetone bath of −20° C. of about 1 meter in length. After being passed through this bath the obtained filaments were wound onto a spool and then washed with water for about 30 minutes at a temperature of 25° C. Measurements were carried out on the resulting filaments in accordance with the aforementioned procedures. The measurements were performed on several filaments.

TABLE XIII

| linear density [dtex] | breaking tenacity [mN/tex] | elongation [%] | initial modulus [N/tex] |
|---|---|---|---|
| 3,2 | 520 | 5,4 | 21 |
| 3,1 | 750 | 6,8 | 23 |
| 2,5 | 560 | 5,6 | 21 |
| 2,1 | 580 | 4,6 | 25 |

EXAMPLE 14

A solution was prepared from 67.6 pbw of orthophosphoric acid (98.3%), 16.5 pbw of polyphosphoric acid (84.5% $P_2O_5$), 15.1 pbw of powdered cellulose (DP 700), and 0.8 pbw of water. The preparation of the solution was as follows:

Orthophosphoric acid was introduced into a Linden-Z kneader with an extruder discharge and melted down. Next, the polyphosphoric acid was added. After a clear, viscous solution had been obtained, there was cooling to 25° C. and immediately afterwards the powdered cellulose was added. The liquid was cooled with kneading. The maximum temperature of the obtained liquid was 37° C. for about 5 minutes. Kneading was continued for 30 minutes, the last 15 of them with degassing. The $P_2O_5$ content in the solvent was calculated to be 73.0%.

The resulting solution was fed to a spinning machine having a 5 µm filter and a spinneret with 250 orifices of 65 µm each. At a jet velocity as indicated below and a temperature of 46° C. extrudates were formed, which after being passed through an air gap of 25 mm were guided to an acetone bath of −12° C. After being passed through this bath (of about 0.6 meter) the obtained filaments were washed in a 4 m long water bath (T=35° C.) equipped with jet washers. The winding speed was 100 m/min at all times, the degree of drying and the moisture content of the yarn are indicated below.

The DP of the cellulose was determined at the outset and was 700, the DP for the solutions and the yarns is listed below.

The properties of the obtained yarns were determined in accordance with procedures mentioned hereinbefore.

Cellulose yarns were manufactured as indicated above, the jet velocity being 22.3 m/min. After washing the resulting yarn was finished and dried on an electrically heated roller at 70° C. until it had a moisture content of about 40%.

The measurements were performed on the obtained fibre bundles after they had been twisted at 214 twists per meter. The DP of the cellulose in the solution was 545, the DP of the obtained fibres 510. The phosphorus content in the yarn was determined and found to be 1%. The properties of the yarns are listed in TABLE XIV.

TABLE XIV

| ex. no. | linear density [dtex] | breaking tenacity [mN/tex] | elongation at break [%] | initial modulus [N/tex] |
|---|---|---|---|---|
| 1 | 351 | 620 | 5,3 | 18,2 |
| 2 | 351 | 620 | 5,4 | 17,8 |

TABLE XIV-continued

| ex. no. | linear density [dtex] | breaking tenacity [mN/tex] | elongation at break [%] | initial modulus [N/tex] |
|---|---|---|---|---|
| 3 | 351 | 560 | 4,7 | 18,2 |
| 4 | 351 | 550 | 4,7 | 17,9 |
| 5 | 351 | 500 | 4,6 | 18,0 |
| average | | 570 | 4,9 | 18,0 |

EXAMPLE 15

Into a Linden-Z kneader with extruder discharge were charged 16,240 g of a solution containing 74.3 wt. % of $P_2O_5$ and 25.6 wt. % of water. This solution was obtained by mixing orthophosphoric acid and polyphosphoric acid in the proper ratio. This clear solution was kneaded for some time at 30°–50° C. After cooling water was added to the solution. After the addition of the water the solution contained 73.1 wt. % of $P_2O_5$ and 26.9 wt. % of water, and the temperature of the solution was 6° C. Immediately after the addition of the water 3,600 g of powdered cellulose were added. After the feeding of the cellulose the solution contained 18 wt. % of cellulose (including the equilibrium moisture of the cellulose). The mixture was kneaded for 30 minutes until a homogeneous solution was obtained. Using a spinning pump this solution was passed to a spinneret via a conveying pipe having a temperature of 30° C. The solution was spun out at 60° C. through the spinneret with 375 capillaries each of a diameter of 65 µm, via an air gap of 30 mm, to a coagulation bath filled with acetone at a temperature of +12° C. The draw ratio in the air gap was about 7. Next, the yarn was washed with water having a temperature of 44° C. and neutralised with 2.5 wt % $Na_2CO_3 \cdot 10H_2O$ solution in water. After neutralisation the yarn was dried and wound at a rate of 120 m/min.

In this way a yarn spun 200 minutes after the addition of the powdered cellulose was obtained, which had a phosphorus content of 0.47%. The yarn had a breaking tenacity of 800 mN/tex, an elongation at break of 5.8%, and a maximum modulus at an elongation of less than 2% of 22.4 N/tex.

EXAMPLE 16

Into a Linden-Z kneader with extruder discharge were charged 14,130 g of a solution containing 74.3 wt. % of $P_2O_5$ and 25.6 wt. % of water. This solution was obtained by mixing orthophosphoric acid and polyphosphoric acid in the proper ratio. This clear solution was kneaded for some time at 30°–50° C. After cooling water was added to the solution. After the addition of the water the solution contained 73.1 wt. % of $P_2O_5$ and 26.9 wt. % of water, and the temperature of the solution was 7° C. Immediately after the addition of the water 2,700 g of powdered cellulose were added. After the feeding of the cellulose the solution contained 16 wt. % of cellulose (including the equilibrium moisture of the cellulose). The mixture was kneaded for 35 minutes until a homogeneous solution was obtained. Using a spinning pump this solution was passed to a spinneret via a conveying pipe having a temperature of 25° C. The solution was spun out at 60° C. through the spinneret with 375 capillaries each of a diameter of 65 µm, via an air gap of 40 mm, to a coagulation bath filled with acetone at a temperature of +11° C. The draw ratio in the air gap was about 6. Next, the yarn was washed with water having a temperature of 44° C. and neutralised with 2.5 wt % $Na_2CO_3 \cdot 10H_2O$ solution in water. After neutralisation the yarn was dried and wound at a rate of 120 m/min.

In this way a yarn spun 120 minutes after the addition of the powdered cellulose was obtained, which had a phosphorus content of 0.25%. The yarn had a breaking tenacity of 860 mN/tex, an elongation at break of 6.7%, and a maximum modulus at an elongation of less than 2% of 22.1 N/tex.

EXAMPLE 17

In a Werner & Pfleiderer ZSK 30 twin-screw extruder as described in Example 4, an anisotropic solution comprising cellulose, phosphoric acid, and water was prepared continuously and was directly spun into a multifilament yarn.

Powdered cellulose Buckeye V60, DP=820 was dosed in the throat of the extruder at a feeding rate of 0.8 kg/hr. Directly after the troat of the extruder a liquid mixture comprising 74.4 wt. % of $P_2O_5$ and water was dosed at a feeding rate of 4.2 kg/hr. The extruder screws were operated at 250 rpm. The temperature in zone 1 of the extruder was set to 0° C., the temperature in zone 2 was set to 10° C., and the temperature in zones 3–7 was set to 20° C. The temperature of the outlet of the extruder was set to 10–15° C. In zones 4, 5, and 6 a reduced pressure of 40–60 mbar was maintained.

The obtained anisotropic solution contained less than 1 wt. % of undissolved particles. Using several spinning pumps this solution was passed through several filters to a spinneret via a conveying pipe. This solution was heated to 52° C. and spun through the spinneret at 59° C. with 375 capillaries each of a diameter of 65 μm, via an air gap of 42 mm, to a coagulation bath filled with acetone at temperature of 10° C. Next, the yarn was washed with water at a temperature of 20° C. and neutralised. After neutralisation with a 2.5 wt. % $Na_2CO_3 \cdot 10H_2O$ solution in water, the yarn was washed again with water at a temperature of 15° C., dried at 150° C. to a water content of 8.5 wt. %, and wound at a rate of 120 m/min.

The obtained yarns had a DP of approximately 610, a content of phosphorus bound to cellulose of approximately 0.50%, a yarn count of 625–635 dtex, a breaking tenacity of 760–775 mN/tex, an elongation at break of 6.3–6.7% and a maximum modulus at an elongation of less than 2% of 19–21 N/tex.

EXAMPLE 18

In a Werner & Pfleiderer ZSK 30 twin-screw extruder as described in Example 4, an anisotropic solution comprising cellulose, phosphoric acid, and water was prepared continuously and was directly spun into a multifilament yarn.

Powdered cellulose Buckeye V65, DP=700 was dosed in the throat of the extruder at a feeding rate of 1.5 kg/hr. Directly after the troat of the extruder a liquid mixture comprising 74.4 wt. % of $P_2O_5$ and water was dosed at a feeding rate of 8.8 kg/hr. The extruder screws were operated at 300 rpm. The temperature in zone 1 of the extruder was set to 0° C., the temperature in zone 2 was set to 10° C., and the temperature in zones 3–7 was set to 20° C. The temperature of the outlet of the extruder was set to 10–15° C. In zones 4, 5, and 6 a reduced pressure of 40–60 mbar was maintained.

The obtained anisotropic solution contained less than 1 wt. % of undissolved particles. Using several spinning pumps this solution was passed through several filters to a cluster spinning assembly via a conveying pipe. This solution was heated to 60° C. and spun through the spinning assembly with 4×375 capillaries each of a diameter of 75 μm at 57° C., via an air gap of 30 mm, to a coagulation bath filled with acetone at temperature of 12° C. Next, the yarn was washed with water at a temperature of 20° C. and wound at a rate of 100 m/min. In a separate step the yarn was neutralised with a 2.5 wt. % $Na_2CO_3 \cdot 10H_2O$ solution in water, washed again with water at a temperature of 15° C., dried, and wound at a rate of 30 m/min.

The obtained yarn had a DP of 590, a content of phosphorus bound to cellulose of 0.22%, a yarn count of 2345 dtex, a breaking tenacity of 620 mN/tex, an elongation at break of 5.7% and a maximum modulus at an elongation of less than 2% of 19.1 N/tex.

EXAMPLE 19

In a Werner & Pfleiderer ZSK 30 twin-screw extruder as described in Example 4, an anisotropic solution comprising cellulose, phosphoric acid, and water was prepared continuously and was directly spun into a multifilament yarn.

Powdered cellulose Buckeye V60, DP=820 was dosed in the throat of the extruder at a feeding rate of 1.5 kg/hr. Directly after the troat of the extruder a liquid mixture comprising 74.4 wt. % of $P_2O_5$ and water was dosed at a feeding rate of 8.87 kg/hr. The extruder screws were operated at 300 rpm. The temperature in zone 1 of the extruder was set to 0° C., the temperature in zone 2 was set to 10° C., and the temperature in zones 3–7 was set to 20° C. The temperature of the outlet of the extruder was set to 10–15° C. In zones 4, 5, and 6 a reduced pressure of 40–60 mbar was maintained.

The obtained anisotropic solution contained less than 1 wt. % of undissolved particles. Using several spinning pumps this solution was passed through several filters to a cluster spinning assembly via a conveying pipe. This solution was heated to 55° C. and spun through the spinning assembly with 4×375 capillaries each of a diameter of 65 μm at 58° C., via an air gap of 25 mm, to a coagulation bath filled with acetone at temperature of 10° C. Next, the yarn was washed with water at a temperature of 20° C. and neutralised with a 2.5 wt. % $Na_2CO_3 \cdot H_2O$ solution in water. After neutralisation the yarn was washed again with water at a temperature of 30° C. using jet washers, dried at 150° C., and wound at a rate of 100 m/min.

The obtained yarns had a yarn count of 2550 dtex, a breaking tenacity of 720–730 mN/tex, an elongation at break of 6.5–6.9% and a maximum modulus at an elongation of less than 2% of 15.5–17.5 N/tex.

We claim:

1. A process for making cellulose extrudates from an optically anisotropic solution, 94–100% of which comprises the following constituents:

cellulose, phosphoric acid and/or its anhydrides, and water; and 0–6 wt % of other constituents, wherein the solution is spun by an air gap spinning process, with the extrudates obtained by this process being coagulated in a coagulant.

2. The process of claim 1, wherein the coagulant has a temperature of less than 30° C.

3. The process of claim 1, wherein the coagulant is an alcohol, ketone, ester, or water, or a mixture of two or more of these constituents.

4. The process of claim 1, wherein the coagulant is isopropanol, n-propanol, acetone, or butanone, or a mixture of these constituents with water.

5. The process of claim 1, wherein the extrudates after being coagulated are washed with water.

6. The process of claim 1, wherein the extrudates are fibers.

7. A cellulose fiber having the following properties:
- a breaking tenacity higher than 700 mN/tex,
- a maximum modulus at an elongation of less than 2% of at least 14 N/tex,
- an elongation at break of at least 4%, and
- a content of phosphorus bound to cellulose of from 0.02 to 1.3 wt. %.

8. The cellulose fiber of claim 7, wherein the content of phosphorus bound to cellulose is from 0.02 to 0.5 wt. %.

9. The cellulose fiber of claim 7 having a compression strength of from 0.30 to 0.35 GPa.

10. A rubber article which can be subjected to mechanical load containing a reinforcing yarn of cellulose, wherein the reinforcing yarn comprises fibers of claim 7.

11. A vehicle tire containing reinforcing yarn of cellulose wherein the reinforcing yarn comprises fibers of claim 7.

12. The cellulose fiber of claim 7, wherein the breaking tenacity is higher than 850 mN/tex.

13. The cellulose fiber of claim 7, wherein the elongation at break is higher than 6%.

14. The cellulose fiber of claim 8, having a compression strength of from 0.30 to 0.35 GPa.

15. The cellulose fiber of claim 7, wherein the lateral birefringence is smaller than $11 \times 10^{-4}$.

* * * * *

UNITED STATES PATENT AND TRADEMARK OFFICE
CERTIFICATE OF CORRECTION

PATENT NO. : 5,932,158
DATED : August 3, 1999
INVENTOR(S) : Hanneke BOERSTOEL, Bernardus Maria KOENDERS and Jan Barend WESTERINK It is certified that error appears in the above-indentified patent and that said Letters Patent is hereby corrected as shown below:

Title page, in item [75], line 3, change "Westrvoort" to --Westervoort--.

in item [62], line 2, after "5,817,801" insert --which is a 371 of PCT/EP95/03272, Aug. 17, 1995--.

Column 5, line 33, change "the-cellulose," to --the cellulose,--.

Column 11, line 51, after "birefringence" delete "an";

line 52, change "$\Delta n = n\| - n_\perp$" to --$\Delta n = n\| - n\perp$--.

Column 13, line 13, change "phosphorus content (%)=($P_{conc}$(mg/1)50)/($C_w$(mg)*10)" to --phosphorus content (%) = ($P_{conc}$(mg/1)*50)/($C_w$(mg)*10)--.

lines 35-36, change "02256-90" to --D2256-90--.

Column 15, line 35, change "0885-62T" to --D885-62T--.

Column 16, line 42, after "½" insert --%--.

Column 19, line 10, change "EXAMPLE 8" to --EXAMPLE 6--.

Signed and Sealed this

Eighteenth Day of January, 2000

Attest:

Q. TODD DICKINSON

*Attesting Officer*  *Commissioner of Patents and Trademarks*